United States Patent
Pollock et al.

(10) Patent No.: US 9,590,541 B2
(45) Date of Patent: Mar. 7, 2017

(54) METHOD AND APPARATUS FOR CONTROL OF ELECTRICAL MACHINES

(75) Inventors: Charles Pollock, Oakham (GB); Helen Pollock, Oakham (GB)

(73) Assignee: TECHNELEC LTD., Oakham (GB)

( * ) Notice: Subject to any disclaimer, the term of this patent is extended or adjusted under 35 U.S.C. 154(b) by 577 days.

(21) Appl. No.: 14/007,304

(22) PCT Filed: Mar. 26, 2012

(86) PCT No.: PCT/GB2012/050656
§ 371 (c)(1),
(2), (4) Date: Oct. 31, 2013

(87) PCT Pub. No.: WO2012/131342
PCT Pub. Date: Oct. 4, 2012

(65) Prior Publication Data
US 2014/0042940 A1      Feb. 13, 2014

(30) Foreign Application Priority Data
Mar. 25, 2011   (GB) .................................. 1104996.2

(51) Int. Cl.
*H02P 6/16*      (2016.01)
*H02P 6/14*      (2016.01)
(Continued)

(52) U.S. Cl.
CPC .............. *H02P 6/142* (2013.01); *H02P 6/15* (2016.02); *H02P 6/153* (2016.02); *H02P 21/04* (2013.01);
(Continued)

(58) Field of Classification Search
CPC ........... H02P 6/182; H02P 21/04; H02P 25/08
(Continued)

(56) References Cited

U.S. PATENT DOCUMENTS

| 4,492,903 A * | 1/1985 | Knight ...................... H02P 6/00 318/373 |
| 7,176,650 B2 * | 2/2007 | Mayes .................. H02P 25/083 318/254.1 |
| 2012/0059642 A1 * | 3/2012 | Vollmer ............. A63B 21/0004 703/13 |

FOREIGN PATENT DOCUMENTS

| GB | 1201584 A | 8/1970 |
| GB | 1573518 A | 8/1980 |
| GB | 2111773 A * | 7/1983 .............. H02P 27/08 |

OTHER PUBLICATIONS

PCT International Search Report and Written Opinion, Application No. PCT/GB2012/050656 dated May 24, 2013, 10 pages.
(Continued)

*Primary Examiner* — Bentsu Ro
*Assistant Examiner* — Gabriel Agared

(57) ABSTRACT

A control system for an electronically commutated motor (401) can rotate smoothly to very low speeds without using a high resolution encoder and can respond to variations in load without excessive speed fluctuations. The control system can be applied to motors operating with low resolution encoders and motors operating with sensorless rotor position feedback. The electronic control system can vary the magnitude and frequency of the stator excitation applied to one or more stator phase windings, the electronic control system comprising a frequency setting section (402) and a magnitude setting section (403) characterized by the fact that the frequency setting section (402) is constrained to operate over a limited range of frequencies, the maximum frequency being a function which is closely related to the frequency associated with rotation of the rotor at the desired speed.

19 Claims, 6 Drawing Sheets

(51) Int. Cl.
    *H02P 21/04*     (2006.01)
    *H02P 25/08*     (2016.01)

(52) U.S. Cl.
    CPC ............ *H02P 25/024* (2016.02); *H02P 25/08* (2013.01); *H02P 25/098* (2016.02)

(58) Field of Classification Search
    USPC .................................................. 318/400.04
    See application file for complete search history.

(56) References Cited

OTHER PUBLICATIONS

GB Search Report, Application No. 1104996.2, dated Jul. 28, 2011, 1 page.

\* cited by examiner $V_s$ = Stator Voltage
$I_s$ = Stator Current
$R_s$ = Resistance of Stator Phase Windings
$X_s$ = Reactance of Stator Phase Windings
$E_s$ = Rotational EMF

METHOD AND APPARATUS FOR CONTROL OF ELECTRICAL MACHINES

RELATED APPLICATIONS

This application is a 35 U.S.C. 371 national stage filing of International Application No. PCT/GB2012/050656, filed on Mar. 26, 2012, which claims priority to United Kingdom Patent Application No. 1104996.2, filed on Mar. 25, 2011.

TECHNICAL FIELD

This invention relates to the control of electrical machines. More specifically the invention relates to, but is not limited to, the control of brushless synchronous electrical machines when operating in the lower part of their speed range.

BACKGROUND

The speed range of an electrical machine is determined by many factors, including but not limited to, pole number, turns per phase and supply voltage. Brushless electronically commutated synchronous motors include permanent magnet brushless dc and brushless ac, hybrid stepping motors, synchronous reluctance, flux switching and switched reluctance motors. In such motors it is particularly difficult to rotate smoothly in the lower part of the speed range. This is especially true when driving a low inertia load in which small changes in torque of the motor or the load can cause very large changes in motor speed. Rotation at low speed is particularly difficult because the inherent torque ripple of the machines interacts with controller response and the interaction of the load dynamics to create an extremely complex system which is difficult to tune and keep stable under all conditions.

An electronically commutated motor relies on knowledge of the position of the rotor to correctly excite particular phase windings in the motor to deliver torque of the required magnitude and direction. This rotor position information can be obtained from a shaft encoder. However to reduce cost the encoder resolution will often be very low. At low speeds, changes in state of the encoder may only occur six times per electrical cycle. If a motor is turning slowly there is a considerable time between position updates making a speed control system very difficult to implement.

Methods to detect the rotational EMF in the motor windings have now become common but they deteriorate at low speeds due to the decrease in the value of the rotational EMF reducing the signal to noise ratio to a level where parameter variations in the EMF estimation algorithm can produce significant position feedback errors.

Smooth rotation at low speed is therefore a problem for electronically commutated synchronous motors with and without sensors on the rotor. In most cases where this is required, the solution has been to fit a high resolution encoder. However this is expensive and not appropriate for many applications.

SUMMARY

It is the purpose of this invention to disclose a control system for an electronically commutated motor which can rotate smoothly to very low speeds without using a high resolution encoder and can respond to variations in load without excessive speed fluctuations. The invention can be applied to motors operating with low resolution encoders and motors operating with sensorless rotor position feedback.

Disclosed herein is an electrical machine with an electronic control system, wherein the electronic control system can vary the magnitude and frequency of the stator excitation applied to one or more stator phase windings, the electronic control system comprising a frequency setting section and a magnitude setting section characterised by the fact that the frequency setting section is constrained to operate over a limited range of frequencies, the maximum frequency being a function which is closely related to the frequency associated with rotation of the rotor at the desired speed.

According to the invention in a first aspect, there is provided an electrical machine comprising: an electronic control system configured to vary a magnitude and frequency of a stator excitation signal applied by an inverter to one or more stator phase windings of the electrical machine, the electronic control system comprising a frequency setting section and a magnitude setting section, the frequency setting section configured to operate up to a maximum frequency that is substantially equal to the frequency associated with operation of a rotor of the electrical machine at a desired operating speed.

It is noted that, although the maximum frequency may in certain circumstances extend beyond the frequency associated with operation of a rotor of the electrical machine at the desired operating speed. This may be required to ensure correct operation of the control system and is intentionally encompassed within the scope of the claims.

Optionally, the frequency setting section is configured to respond to a drop in the operating frequency of the machine to set a frequency for the stator excitation signal which substantially follows and maintains synchronism with the desired operating speed of the electrical machine.

Optionally, the frequency setting section is configured not to respond to instantaneous increases in the rotational frequency of the machine beyond the maximum frequency.

Optionally, the magnitude setting section is configured to respond to a drop in the operating frequency of the machine to increase the magnitude of the stator excitation signal to reduce the error between an operating frequency of the electrical machine and a target operating frequency.

Optionally, the magnitude setting section is configured to respond to an instantaneous increase in the operating speed of the machine to decrease the magnitude of the stator excitation signal.

Optionally, the magnitude of the stator excitation signal is one of the magnitude of a current of the stator excitation signal and the magnitude of a voltage of the stator excitation signal.

According to the invention in a second aspect, there is provided a method for controlling an electrical machine comprising an inverter configured to provide a stator excitation signal to one or more stator phase windings of the electrical machine and an electronic control system comprising a frequency setting section and a magnitude setting section for setting the frequency and magnitude of the stator excitation signal, the method comprising: operating the frequency setting section up to a maximum frequency being a function which is closely related to the frequency associated with operation of a rotor of the electrical machine at a desired operating speed.

According to the invention in a third aspect, there is provided an electronic control system for controlling an electrical machine and configured to vary a magnitude and frequency of a stator excitation signal applied by an inverter to one or more stator phase windings of an electrical machine, the electronic control system comprising a frequency setting section and a magnitude setting section, the frequency setting section configured to operate up to a maximum frequency being a function which is closely related to the frequency associated with operation of a rotor of the electrical machine at a desired operating speed.

According to the invention in a fourth aspect, there is provided a method for controlling an electrical machine comprising: varying a magnitude and frequency of an excitation signal applied by an inverter to one or more phase windings of an electrical machine, wherein the frequency of the excitation signal is limited to a maximum frequency value determined by a target operating speed of the electrical machine.

Optionally, the maximum frequency value is substantially equal to a frequency of excitation signal required at the target operating speed.

Optionally, the maximum frequency value is a function of the target operating speed and an acceleration rate of a rotor of an electrical machine.

Optionally, the method further comprises estimating a position of a rotor of an electrical machine and determining the variation of the magnitude and frequency of the excitation signal based on a comparison of the estimated rotor position and a target rotor position.

Optionally, estimating rotor position comprises estimating rotor position by sensorless position estimating scheme.

Optionally, the method further comprises, if the estimated rotor position is ahead of the target rotor position, increasing the frequency of the excitation signal not beyond the maximum frequency value and decreasing the magnitude of the excitation signal.

Optionally, the method further comprises limiting the magnitude of the excitation signal to a maximum magnitude value for protecting power electronic circuits in an inverter.

Optionally, the electrical machine is a reluctance machine, and further comprising limiting the magnitude of the excitation signal to a minimum magnitude value necessary to allow rotor position estimation based on current measurement.

Optionally, the method further comprises, if the estimated rotor position is behind the target rotor position, decreasing the frequency and increasing the magnitude of the excitation signal.

Optionally, the method further comprises limiting the frequency of the excitation signal to a minimum frequency value for pick up and resynchronisation of a rotor that has stalled due to excessive torque, and increasing the magnitude of the excitation signal to a maximum magnitude value.

Optionally, the method further comprises, if the estimated rotor position is substantially equal to the target rotor position, making substantially no change to the frequency and magnitude of the excitation signal.

Optionally, varying the magnitude of the stator excitation signal comprises varying one of the magnitude of a current of the stator excitation signal and the magnitude of a voltage of the stator excitation signal.

According to the invention in a fifth aspect, there is provided a computer readable medium comprising computer program code configured, when read by a computer, to carry out the method described above.

According to the invention in a sixth aspect, there is provided a control system for controlling an inverter for control of an electrical machine, the control system configured to carry out the method described.

According to the invention in a seventh aspect, there is provided an electrical machine comprising a control system as described above.

BRIEF DESCRIPTION OF THE DRAWINGS

In order that the invention may be more fully understood reference will now be made, by way of example, to the accompanying drawings, in which.

DESCRIPTION

Figure 1:
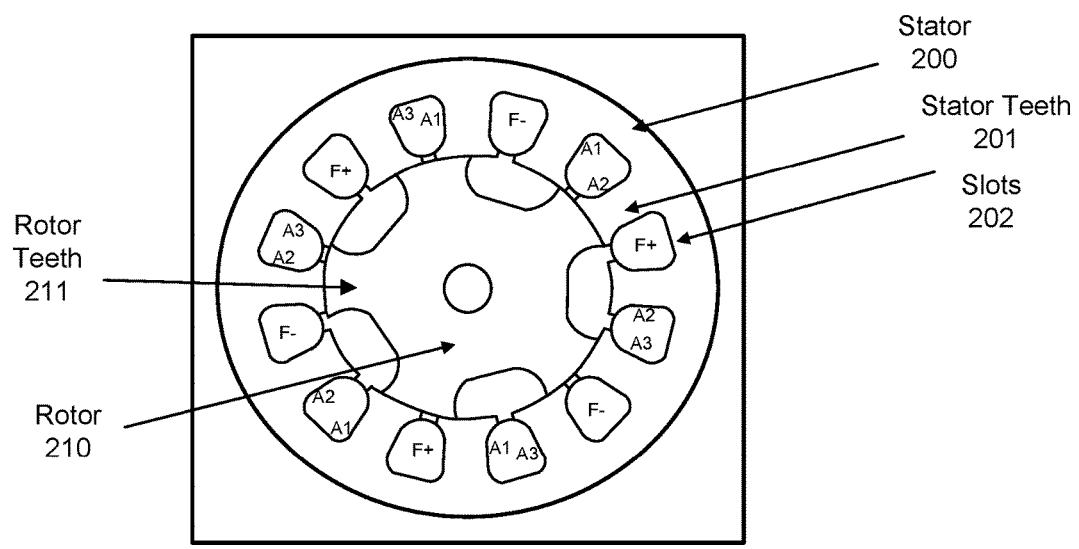
FIGS. 1, 2, 3 and 4 are sections through exemplary electrical machines.

FIG. 1 shows a three phase flux switching machine. A stator 200 has 12 teeth 201 and 12 slots 202 between the teeth. The stator slots carry stator windings. Six of the slots carry field windings, each field slot carrying a current in the opposite direction to the next field slot, to create a six pole magnetic field. The other six slots carry three phase windings or armature windings, $A_1$, $A_2$ and $A_3$. The rotor 210 of the flux switching machine is made of laminated steel and carries no windings or permanent magnets. In this example the rotor has five teeth 211. With field current supplied to the field winding, rotation of the rotor within the stator induces three alternating voltages 120° apart. If the three armature phase windings are connected to a three phase inverter and armature currents are delivered to the windings in synchronism with the induced EMF continuous motoring or generating is achieved. Flux switching motors in which the field winding is replaced by permanent magnets are also possible and can be controlled according to methods and apparatuses disclosed herein.

Figure 2:
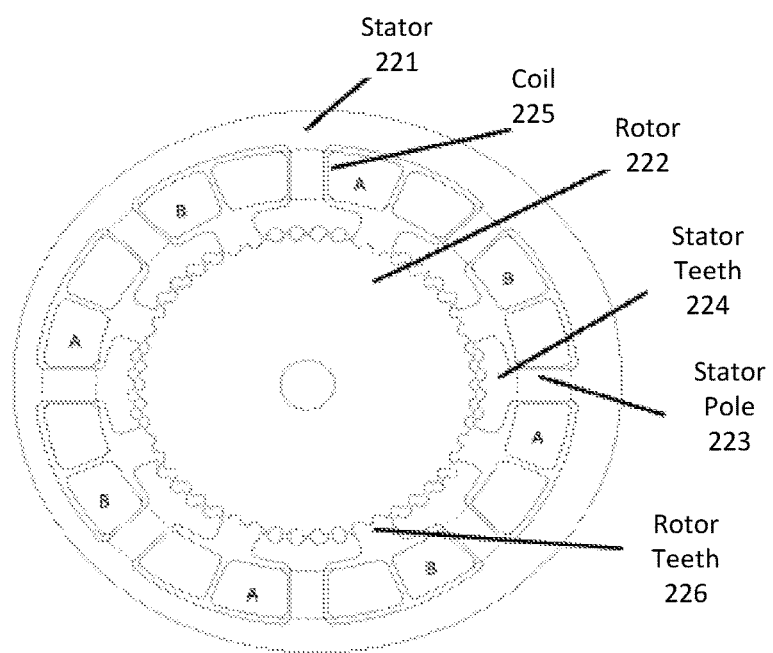

The hybrid stepping motor is a further example of a synchronous motor. Hybrid stepping motors usually have two, three or five phase windings. FIG. 2 illustrates a transverse cross-section through one end of a typical two-phase hybrid stepping motor.

The two-phase hybrid stepping motor of FIG. 2 consists of a stator 221 and a rotor 222, both of which are constructed from stacked laminations of electrical grade steel. The stator has eight poles 223, four for each phase, which widen at the tips to a group of teeth 224. Each stator pole 223 has a winding in the form of a short-pitched phase coil 225. These coils 225 are connected, usually in series, to form two electrically independent motor phase windings A and B. The rotor has a large number of radially spaced teeth 226 (typically 50) at each of its ends, and incorporates a permanent magnet which produces static flux along the axis of the machine. This makes the rotor teeth at one end of the machine all North poles and the rotor teeth at the other end of the rotor all South poles. The teeth 226 at one end of the rotor 222 are offset by half a tooth pitch with respect to the teeth 226 at the other end of the rotor 222. The rotor tooth pitch is the same as the tooth pitch of the stator 221. The EMF induced in the two stator phase windings arises from the rotation of the rotor. The EMF in phase A is 90° phase shifted from the EMF in phase B.

Figure 3:
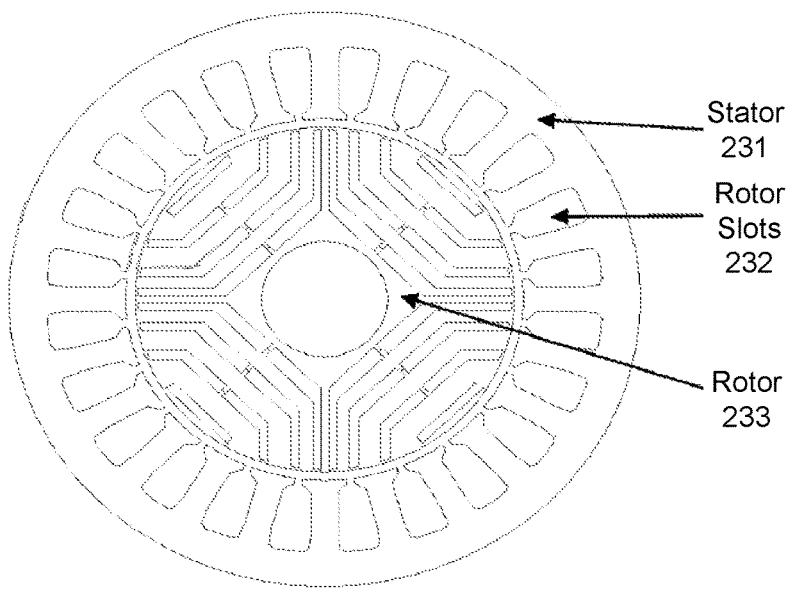

FIG. 3 shows a synchronous reluctance motor with stator 231 and rotor 233. The stator shown has 24 slots 232 though 12 and 36 are also common. The stator slots contain a distributed three phase winding. The rotor 233 is made from laminated steel and contains slotting to act as flux barriers. This creates axes of high and low reluctance such that if the stator winding creates a 4 pole magnetic field the rotor will align the flux barriers so that the stator flux follows a low reluctance path. As the stator field rotates the rotor will follow the field in synchronism. Many different rotor constructions can be used, the aim being to deliver the maximum ratio of reluctance variation. In this motor there is no rotating magnet to induce an EMF in the stator windings; the torque is created by variations in the self inductances of the stator windings and variations in the mutual inductance between phase windings as the rotor rotates.

As an enhancement to the synchronous reluctance motor, permanent magnets can be inserted within the rotor slotting to increase the magnetic saliency further and increase torque production. Such a machine is known as an interior permanent magnet synchronous motor.

Figure 4:
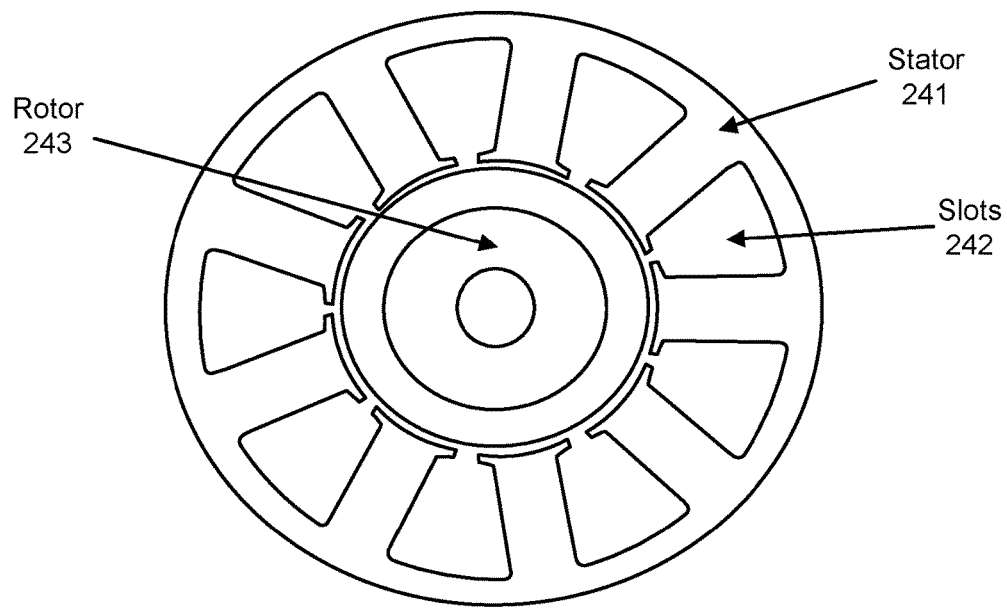

FIG. 4 is a more common permanent magnet synchronous motor. The stator 241 is again made from laminated steel. In this example the stator has 9 teeth interspersed between the 9 slots 242. The stator winding would typically be wound with a short pitch with one coil wound around each tooth and then the three coils spaced at 120° to each other connected together to create each of three phase windings. The rotor 243 has a steel core surrounded by a layer of permanent magnet material. In this example the permanent magnets are magnetised radially to create a six pole magnetic field. Rotation of the rotor induces three EMFs in the stator windings which are displaced in phase by 120° (electrical degrees). Operation as a motor requires an inverter to deliver three alternating armature currents in synchronism with the internal EMF induced in each winding.

All of these machine types have the common feature that they can be modelled as having an internally induced, rotational EMF in the stator windings. The rotational EMF may include components from the rotation of magnets in permanent magnet motors or through the variation in reluctance in rotor designs containing a variable reluctance structure. In synchronous reluctance motors the variation in reluctance as the rotor rotates leads to variations in self inductance of each phase winding and variations in mutual inductance between windings. The term "rotational EMF" as used herein, encompasses any time varying combination of changing fluxes, due to a phase winding's own current (self inductance), the currents in other windings (mutual inductance) or a rotating permanent magnet. In certain interior permanent magnet motors the rotational EMF will comprise components from variations in both permanent magnet flux and reluctance as the rotor rotates. In the flux switching motor the rotational EMF is induced by the rate of change of mutual coupling with a stationary field winding or stationary field magnets.

In the mathematical analysis of electrical machines of these types it is common to analyse the machine totally in electrical cycles and electrical degrees. When this is done the analysis is similar for all synchronous machines of any type and pole numbers. In such analysis it is common to transform the statically orientated, time varying quantities of each stator phase winding into a single system of rotating vectors, rotating at the same speed as the average speed of the rotor.

Figure 5:
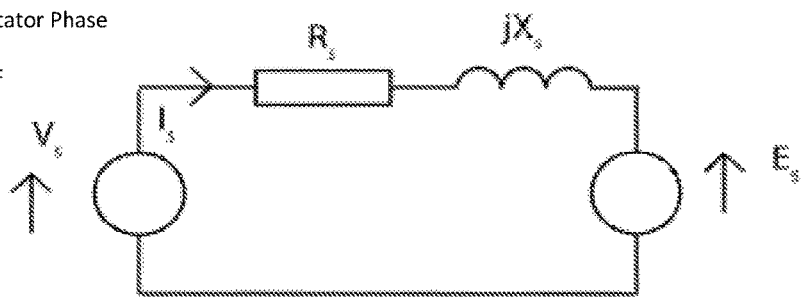
FIG. 5 shows an equivalent circuit of an electrical machine in the rotating reference frame.

Using the electrical quantities on a rotating reference frame containing components of all the phase windings of the motor an equivalent circuit is shown in FIG. 5. The stator voltage equation, in the rotating reference frame, is given by:

$$\overline{V}_s = \overline{E}_s + j\overline{I}_s X_s + \overline{I}_s R_s \quad (1)$$

Where $\overline{V}_s$, $\overline{E}_s$, $\overline{I}_s$ are the vector quantities of the stator voltage, rotational EMF and stator current with respect to the rotating reference frame; $X_s$ is the reactance of the stator phase winding and $R_s$ is the resistance of the stator phase windings. $X_s$ may also be a complex vector with different in-phase and out-of-phase components. This is common in motors with significant variation in reluctance (and hence stator inductance) at different rotor orientations. An example of such a motor where reactance $X_s$ could have different quadrature components would be an interior permanent magnet synchronous motor or a synchronous reluctance motor. However, since the rotating reference frame rotates with the rotor, the components of Xs do not vary significantly with time and the term $j\overline{I}_s X_s$ does not contribute to torque production.

The torque produced by the motor is given by $$T = \frac{\overline{I}_s * \overline{E}_s \cos(\gamma)}{\omega} \quad (2)$$

where γ is the angle between the rotational EMF vector and the stator current; ω is the rotational velocity of the rotor in mechanical radians per second.

Operation of the motor with maximum torque per ampere is achieved if γ=0 and the $\overline{E}_s$ and $\overline{I}_s$ vectors are coincident. When, γ=0, the rotational EMF vector $\overline{E}_s$ is in phase with the stator current vector and the torque is again given by equation (2) which is now maximum and equal to.

$$T = \frac{\overline{I}_s * \overline{E}_s}{\omega} \quad (3)$$

The angular position of the EMF vector with respect to the stator current vector therefore determines the torque production of the motor.

Figure 6:
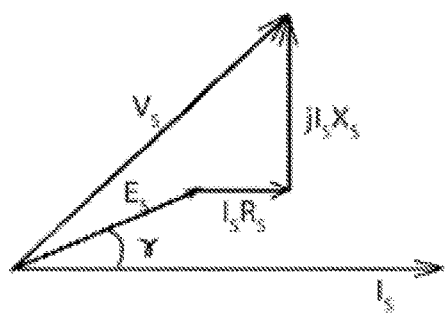
FIG. 6 shows a vector diagram in the rotating reference frame of a motor in use.
Figure 7:
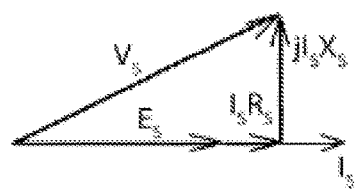
FIG. 7 shows a further vector diagram of a motor controlled at an alternative excitation level.

FIG. 6 shows a vector diagram showing one possible relationship between the vectors represented in the stator voltage equation (1) with the vectors calculated on the rotating reference frame. In the example illustrated by FIG. 6, the $\overline{E}_s$ vector leads the $\overline{I}_s$ vector by an angle γ, and the torque is given by equation (2). Since γ>0, Cos(γ)<1 and the machine is operating with less than the maximum torque per ampere. If the current magnitude were reduced at the same speed and load the angle, γ, would decrease until the situation illustrated by FIG. 7 was reached. In FIG. 7 the $\overline{E}_s$ and $\overline{I}_s$ vectors are coincident; γ=0, the rotational EMF vector $\overline{E}_s$ is in phase with the stator current vector and the torque is given by equation (3).

Figure 8:
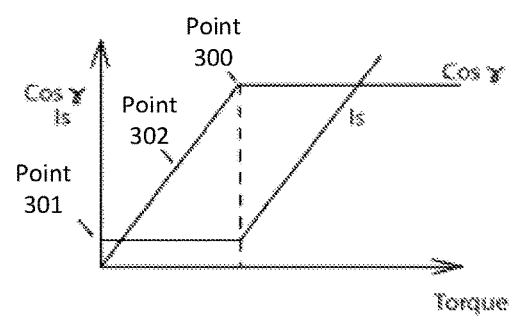
FIG. 8 shows a graph of the variation of controlled parameters with torque.

Operation of an electronically controlled motor can be explained with reference to FIG. 8. FIG. 8 is a graph of one set of possible values of $\overline{I}_s$ and Cos(γ) as the torque output of a machine increases. At point 301 Cos(γ) is zero, $\overline{I}_s$ is a minimum value, not necessarily zero, and the torque output given by equation (2) is zero. In this case the $\overline{E}_s$ vector leads the $\overline{I}_s$ vector by 90°. As the torque increases the value of Cos(γ) increases and the angle between the $\overline{E}_s$ vector and the $\overline{I}_s$ vector decreases. Point 302 would be representative of the condition illustrated by FIG. 6. At point 300 the value of Cos(γ) is close to one and the $\overline{E}_s$ vector is close to being in phase with the $\overline{I}_s$ vector (as illustrated by FIG. 7). In order for the torque to increase further the magnitude of $\overline{I}_s$ must now increase.

The operation of a motor using an electronic control system delivers significant improvements to the stability of low speed operation by smoothly transferring between operation to the left and to the right of point 300 in FIG. 8. In this way the methods and apparatuses disclosed herein avoid the destabilising effect of sudden changes in load when operating at low speeds.

Figure 9:
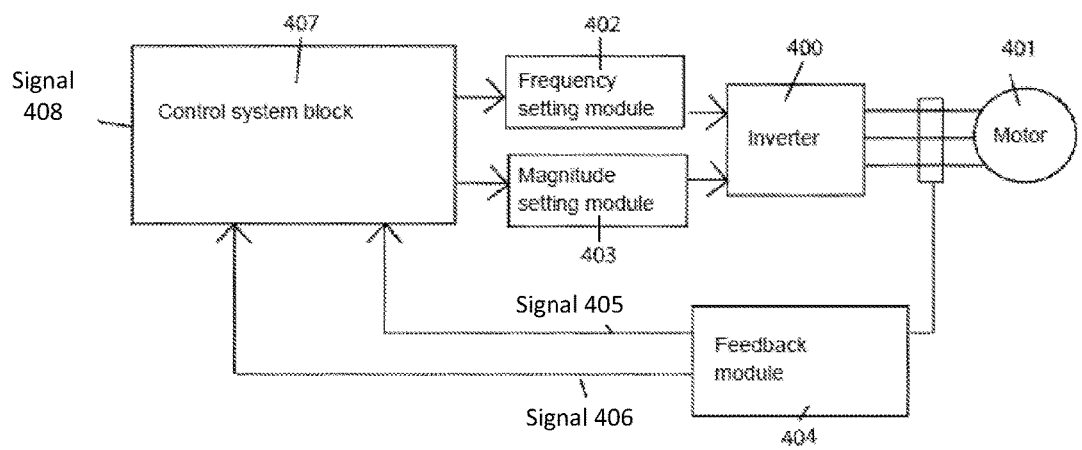
FIG. 9 shows a block diagram of an electronic control system.

The block diagram in FIG. 9 shows the component parts of an electronic control system. An inverter 400 is connected to an electronically controlled motor 401. The electronic control system has a frequency setting module 402 and a magnitude setting module 403. Together these modules determine the frequency and magnitude of the excitation supplied by the inverter to the motor. The inverter output excitation may be voltage or current controlled.

To ensure that synchronism is maintained between the stator excitation and the rotor position a feedback module 404 monitors the rotor position and/or rotor speed. The feedback module 404 can take many forms. The rotor position could be monitored by an encoder or similar position sensing device on the rotor of the machine. Alternatively a sensorless scheme could estimate the position and speed by monitoring the rotational EMF or by monitoring changes in the self inductance or mutual inductance of the phase windings as the rotor rotates relative to the stator.

A method for the estimation of rotor position which can be used in conjunction with the methods and apparatuses disclosed herein is disclosed in PCT/EP2009/065281.

The feedback module 404 provides signals 405 and/or 406 to a control system block 407.

Signal 405 may be representative of the rotor angle usually estimated relative to the stator excitation vectors. Signal 406 may be representative of the rotor speed, allowing the control system block 407 to update an estimate for rotor position. The control system module 407 may have one or more additional inputs from an external source which may, for example, set the desired speed of rotation of the motor.

Figure 10:
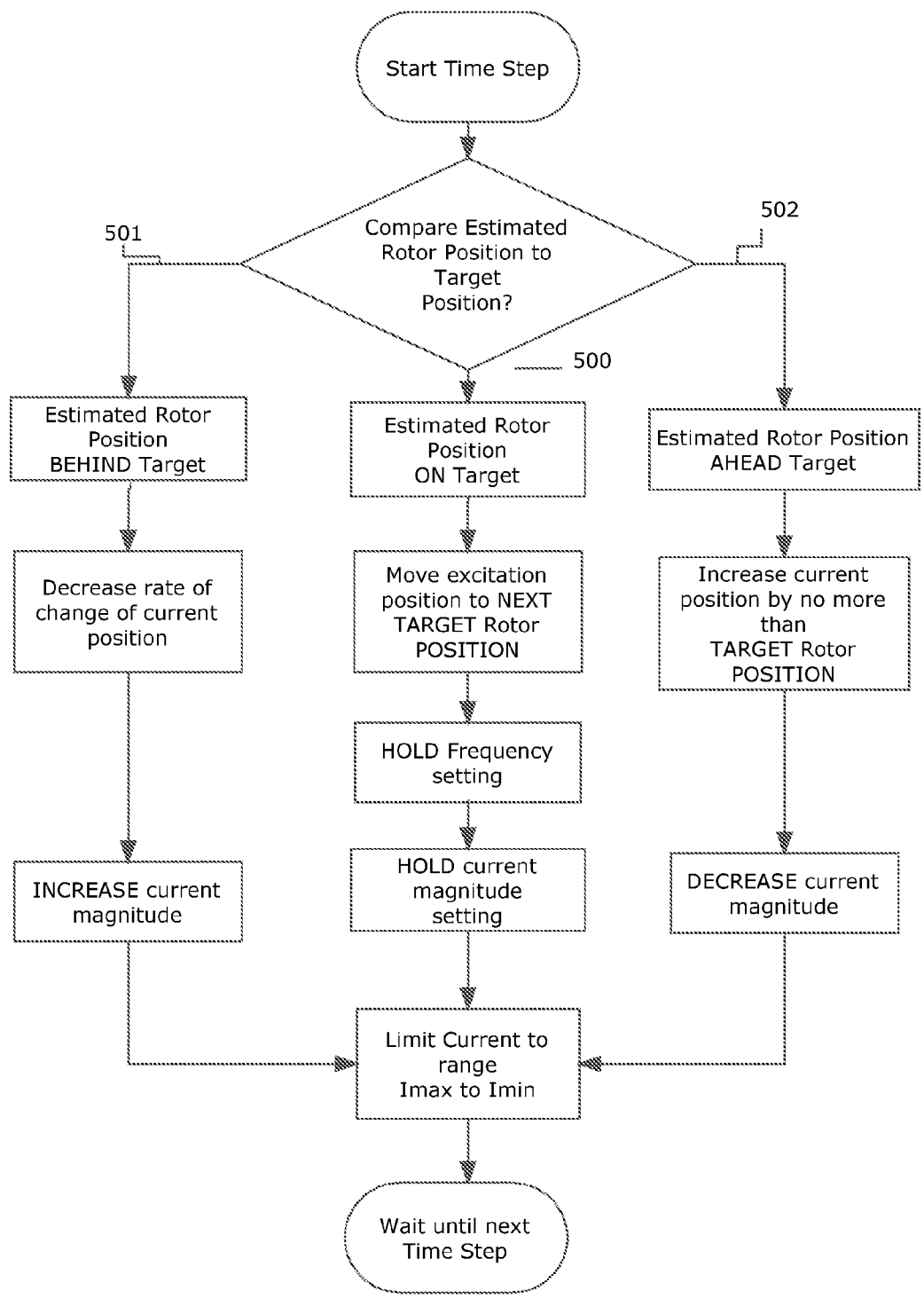
FIG. 10 shows a flow chart of a decision process occurring in an electronic control system.

The operation of the control system block 407 can be explained with the aid of the flowchart in FIG. 10. The flowchart shows one execution or time step of the control system. The execution first uses signals 405 and/or 406 to update the position estimate of the rotor. The estimated position of the rotor is then checked against a target position. The target position is determined by the desired operating conditions. For example if signal 408 is setting a speed target then the target position of the rotor in each time step or execution cycle can be calculated by moving the target position on by an angle which is consistent with operating the motor at the desired speed target. There are three situations which can occur when the estimated rotor position is compared with the target position.

If the estimated rotor position is close to the target position for this time step this is a sign that the frequency and magnitude of the stator excitation is appropriate to maintain the desired set point speed. The inverter excitation and magnitude setting module do not need to be altered. Path 500 in the flow-chart of FIG. 10 shows that the frequency and magnitude of the inverter excitation is held at the present value and the excitation vector moves to a new position, keeping the rotor close to the target position.

If the estimated rotor position is behind the target position (path 501 in FIG. 10) this is an indication that the torque applied to the rotor shaft has caused the instantaneous rotor velocity to decrease. The controller must react quickly to avoid a loss of synchronism. The frequency setting (rate of change of stator excitation angle with time) must be reduced so that the stator excitation remains synchronised to the estimated rotor position. The reduction in the stator excitation frequency setting is an immediate indication of rotation below target speed set by signal 408. This error is used to increase the excitation setting magnitude in the magnitude setting module. This will increase the torque as shown in FIG. 8 and act to reduce the rotor position and speed errors.

If the estimated rotor position is ahead of the target position for this time step (path 502 in FIG. 10), this is an indication that the torque output of the motor was greater than the required load torque. This is the situation represented by FIG. 6 where $\overline{E}_s$ leads $\overline{I}_s$ by an angle γ. Conventional controllers would increase the frequency of the stator excitation to move the stator excitation forward to maintain synchronism with the advancing rotor position. However, since the target position was advanced since the last time step by an amount equivalent to the angle covered by the rotor when rotating at the target speed, any increase in stator excitation frequency setting above the target speed leads to an overshoot in motor speed above target speed. Unless the controller gains are closely matched to load dynamics, and the current magnitude is reduced rapidly, this quickly leads to a significant overshoot in rotor speed above the target speed. Conventional controllers rely on this overshoot to generate the negative error which acts on the current setting to reduce the torque and bring the torque under control. In the control system disclosed herein, the frequency is not allowed to increase without limit and the frequency setting module is limited to commanding a frequency which is directly related to the stator excitation at the target speed. In one embodiment the frequency setting module limits the frequency of the inverter to exactly the synchronous frequency at the target speed, this forces the motor to operate where the rotational EMF and current vectors are not in phase and where the rotational EMF leads the current vector with an angle γ. Referring to FIG. 8, the motor is operating in the region to the left of point 300. In this mode, the torque output of the motor can therefore be reduced rapidly as the rotor moves ahead of the stator excitation due to the fact that the stator excitation is held at the target speed. In this way the motor speed fluctuation caused by a drop in load torque is eliminated and stable operation at the target speed even at low rotational speeds is possible.

Continued operation in a condition where the estimated rotor position is ahead of the target position is undesirable since the motor is not operating with optimum torque per ampere. The positive position error or instantaneous velocity error above the target velocity is therefore used by the control system to reduce the current magnitude (or voltage magnitude) thus improving the torque angle of the motor and increasing the torque per ampere. The revised current (or voltage) magnitude calculated by the control system following paths 501 or 502 of FIG. 10 is limited to maximum and minimum values before being passed to the magnitude setting module of the inverter. The maximum current magnitude is to protect the power electronic circuits in the inverter. The minimum current magnitude setting is dependent on the motor type. In motors with permanent magnets there is no requirement to have a minimum current to maintain sensorless feedback.

In reluctance motors such as synchronous reluctance motors it is necessary to maintain a minimum current magnitude setting such that position estimation based on current measurements will continue to operate.

A control system as disclosed herein therefore acts to set the frequency setting and magnitude setting for stator excitation within constraints such that the maximum frequency is determined by the target speed. In this way the control of a motor operating in the lower part of its speed range can be achieved under conditions of variable load and varying inertia without the need for extensive gain tuning.

In some embodiments it may be appropriate to have a minimum frequency setting in path 501; this minimum frequency can be selected to be low enough to pick up and resynchronise a rotor which had stalled due to excessive torque. Under such conditions the magnitude setting section could default to maximum stator excitation.

The minimum could also be chosen to be the minimum frequency at which the rotor estimation algorithm can operate effectively.

A further advantage of the control system disclosed herein is that it can be used as an extremely robust speed controller protecting against over speed of a difficult to tune or intermittent torque load. When a motor is first switched on the load on the rotor may be unknown. Initial current may cause high rates of acceleration. The methods and apparatuses disclosed herein can be used to ensure that the frequency setting module does not exceed the target speed even when current levels are capable of faster acceleration. In such situations the rotor angle error will be positive and will act to reduce the magnitude setting by reducing the current or voltage applied to the electrical machine. In embodiments used to control accelerations it may be advantageous to make the upper frequency limit a function of the set or target speed and the acceleration rate.

Electronically controlled motors can be controlled to operate to very low speeds without using excessive currents (as used by open loop controllers such as common in stepping motor drives). Over speed is eliminated under accelerations and rapid response to load fluctuations is possible.

Implementation of the methods and apparatuses disclosed herein has been described with reference to electric motors with rotors rotating relative to a stator. They can be applied directly to linear electric motors to control linear travel velocities under conditions of changing loads. Such motors still have electrical cycles which can be modelled as systems of rotating vectors.

Whilst the method described herein is particularly effective at low speeds, there is no restriction which prevents it being used throughout the speed range of an electrical machine. When a motor is operating close to maximum speed for a given load, if the load is suddenly removed or reduced, then conventional torque controlled motors would immediately accelerate and would rely on the dynamics of a control loop to react to the increase in speed to reduce the torque demand setting and prevent further acceleration. The method disclosed would prevent any overspeed by constraining the frequency of operation to the desired frequency and preventing the excitation frequency from increasing and holding the rotor speed very stiffly to the desired speed.

The skilled person will be able to envisage further embodiments without departing from the scope of the appended claims.

The invention claimed is:

1. A synchronous electrical machine comprising:
an electronic control system configured to vary a magnitude and frequency of a stator excitation signal applied by an inverter to one or more stator phase windings of the synchronous electrical machine, the electronic control system comprising a frequency setting section and a magnitude setting section, wherein:
the frequency setting section is configured to determine a maximum frequency of the stator excitation signal that is substantially equal to the frequency associated with operation of a rotor of the synchronous electrical machine at a target operating speed;
the frequency setting section is configured to respond to a drop in the operating frequency of the synchronous electrical machine by setting a frequency for the stator excitation signal which substantially follows and maintains synchronism with the operating speed of the synchronous electrical machine; and
in the event of an instantaneous increases in the rotational frequency of the synchronous electrical machine beyond the maximum frequency, the frequency setting section is configured to maintain the stator excitation signal at the maximum frequency.

2. The synchronous electrical machine according to claim 1, wherein the magnitude setting section is configured to respond to a drop in the operating frequency of the synchronous electrical machine to increase the magnitude of the stator excitation signal to reduce the error between an operating frequency of the synchronous electrical machine and a target operating frequency.

3. The synchronous electrical machine according to claim 1, wherein the magnitude setting section is configured to respond to an instantaneous increase in the operating speed of the synchronous electrical machine to decrease the magnitude of the stator excitation signal.

4. The synchronous electrical machine according to claim 1, wherein the magnitude of the stator excitation signal is one of the magnitude of a current of the stator excitation signal and the magnitude of a voltage of the stator excitation signal.

5. A method for controlling a synchronous electrical machine comprising an inverter configured to provide a stator excitation signal to one or more stator phase windings of the synchronous electrical machine and an electronic control system comprising a frequency setting section and a magnitude setting section for setting the frequency and magnitude of the stator excitation signal, the method comprising:
operating the frequency setting section to determine a maximum frequency of the stator excitation signal that is substantially equal to the frequency associated with operation of a rotor of the synchronous electrical machine at a target operating speed;
operating the frequency setting section to respond to a drop in the operating frequency of the synchronous electrical machine by setting a frequency for the stator excitation signal which substantially follows and maintains synchronism with the operating speed of the synchronous electrical machine; and
in the event of an instantaneous increase in the rotational frequency of the synchronous electrical machine beyond the maximum frequency, operating the frequency setting section to maintain the stator excitation signal at the maximum frequency.

6. A non-transitory computer readable medium comprising computer program code configured, when read by a computer, to carry out the method of claim 5.

7. An electronic control system for controlling a synchronous electrical machine and configured to vary a magnitude and frequency of a stator excitation signal applied by an inverter to one or more stator phase windings of the synchronous electrical machine, the electronic control system comprising a frequency setting section and a magnitude setting section, wherein:

the frequency setting section is configured to determine a maximum frequency of the stator excitation signal that is substantially equal to the frequency associated with operation of a rotor of the synchronous electrical machine at a target operating speed;

the frequency setting section is configured to respond to a drop in the operating frequency of the synchronous electrical machine by setting a frequency for the stator excitation signal which substantially follows and maintains synchronism with the operating speed of the synchronous electrical machine; and in the event of an instantaneous increase in the rotational frequency of the synchronous electrical machine beyond the maximum frequency, the frequency setting section is configured to maintain the stator excitation signal at the maximum frequency.

8. A method for controlling a synchronous electrical machine comprising:

varying, by an electronic control system, a magnitude and frequency of a stator excitation signal applied by an inverter to one or more phase windings of the synchronous electrical machine, wherein the electronic control system includes a frequency setting section and a magnitude setting section;

determining, by the frequency setting section, a maximum frequency value from a target operating speed of the synchronous electrical machine;

limiting, by the frequency setting section, the frequency of the stator excitation signal to the maximum frequency value;

responding, by the frequency setting section, to a drop in the operating frequency of the synchronous electrical machine by setting a frequency for the stator excitation signal which substantially follows and maintains synchronism with the operating speed of the synchronous electrical machine; and in the event of an instantaneous increase in the rotational frequency of the synchronous electrical machine beyond the maximum frequency, maintaining, by the frequency setting section, the stator excitation signal at the maximum frequency.

9. The method according to claim 8, varying the magnitude of the stator excitation signal comprises varying one of the magnitude of a current of the stator excitation signal and the magnitude of a voltage of the stator excitation signal.

10. The method according to claim 8, wherein the maximum frequency value is substantially equal to a frequency of excitation signal required at the target operating speed.

11. The method according to claim 8, wherein the maximum frequency value is a function of the target operating speed and an acceleration rate of a rotor of the synchronous electrical machine.

12. The method according to claim 8, further comprising estimating a position of a rotor of the synchronous electrical machine and determining the variation of the magnitude and frequency of the excitation signal based on a comparison of the estimated rotor position and a target rotor position.

13. The method according to claim 12, wherein estimating rotor position comprises estimating rotor position by sensorless position estimating scheme.

14. The method according to claim 12, further comprising, if the estimated rotor position is behind the target rotor position, decreasing the frequency and increasing the magnitude of the excitation signal.

15. The method according to claim 12, further comprising, if the estimated rotor position is substantially equal to the target rotor position, making substantially no change to the frequency and magnitude of the excitation signal.

16. The method according to claim 12, further comprising, if the estimated rotor position is ahead of the target rotor position, increasing the frequency of the excitation signal not beyond the maximum frequency value and decreasing the magnitude of the excitation signal.

17. The method according to claim 16, further comprising limiting the magnitude of the excitation signal to a maximum magnitude value for protecting power electronic circuits in an inverter.

18. The method according to claim 16, wherein the synchronous electrical machine is a reluctance machine, and further comprising limiting the magnitude of the excitation signal to a minimum magnitude value necessary to allow rotor position estimation based on current measurement.

19. The method according to claim 18, further comprising limiting the frequency of the excitation signal to a minimum frequency value for pick up and resynchronisation of a rotor that has stalled due to excessive torque, and increasing the magnitude of the excitation signal to a maximum magnitude value.

* * * * *